United States Patent
Wehking

[19]

[11] Patent Number: 5,425,283
[45] Date of Patent: Jun. 20, 1995

[54] MULTI-SPEED POWER TRANSMISSION

[75] Inventor: Jeffrey B. Wehking, Ann Arbor, Mich.

[73] Assignee: General Motors Corporation, Detroit, Mich.

[21] Appl. No.: 123,488

[22] Filed: Sep. 17, 1993

[51] Int. Cl.$^6$ .............................................. F16H 3/08
[52] U.S. Cl. .......................................... 74/331; 74/333
[58] Field of Search ............... 74/331, 333, 325, 359, 74/360

[56] References Cited

U.S. PATENT DOCUMENTS

| | | | |
|---|---|---|---|
| 3,916,710 | 11/1975 | Sisson et al. | 74/331 |
| 4,237,749 | 12/1980 | Kuivunen | 192/87.11 X |
| 4,461,188 | 7/1984 | Fisher | 74/331 X |
| 4,495,838 | 1/1985 | Gooch | 74/331 X |

Primary Examiner—Charles A. Marmor
Assistant Examiner—Peter Kwon
Attorney, Agent, or Firm—Donald F. Scherer

[57] ABSTRACT

A countershaft type multi-speed power transmission has a plurality of gear meshes disposed on three axes including a forward final drive gear and a reverse final drive gear. Both the low forward ratio and the reverse ratio drive paths include a common one-way device. The gear meshes and a plurality of selectively operable friction clutches are positioned on shafting disposed on the three axes to provide a compact overall axial length for the transmission assembly.

1 Claim, 1 Drawing Sheet

5,425,283

MULTI-SPEED POWER TRANSMISSION

TECHNICAL FIELD

This invention relates to power transmissions, and more particularly, to multi-speed countershaft power transmissions. Specifically, this invention relates to countershaft power transmissions having a plurality of fluid operated friction clutches disposed on shaft members of the transmission for selectively connecting the gear members thereto.

BACKGROUND OF THE INVENTION

Countershaft type power shifting transmissions are finding increasing usage in passenger vehicles. A majority of the transmissions have a synchronizer type clutch to establish the forward and reverse drive paths. Other of these types of transmissions utilize fluid operated friction clutches to establish the forward and reverse drive paths. The synchronizer type forward and reverse mechanisms also utilize a fluid operated clutch. However, the particular gear path to be utilized is determined by the synchronizer.

The lowest or first forward gear ratio drive path generally includes a one-way device which permits untimed upshifting from the first or lowest ratio to the second ratio. The prior art transmissions use distinct gear paths from the input shaft to a common output shaft and a separate idler gear axis in the reverse path.

SUMMARY OF THE INVENTION

A transmission incorporating the present invention has a forward power path and a reverse power path, both of which use a common one-way driving member and separate input gears in the final drive assembly. The transmission deploys an input shaft and two countershafts which support the gears and clutches in a manner to minimize the overall axial dimension of the transmission.

It is therefore an object of this invention to provide an improved countershaft transmission having a common one-way drive member operable in both a forward ratio and a reverse ratio.

It is another object of this invention to provide an improved countershaft transmission having four forward speeds and one reverse speed, wherein the axial length of the transmission is accommodated in the axial space required by four gear meshes and four fluid operated clutches.

It is a further object of this invention to provide an improved countershaft transmission having a low forward power path including a one-way drive device, a fluid operated clutch and a final drive input gear, and a reverse power path including the one-way drive device, a fluid operated clutch and a final drive input gear.

These and other objects and advantages will be more apparent from the following description and drawings.

DESCRIPTION OF THE EXEMPLARY EMBODIMENTS

Figure 1:
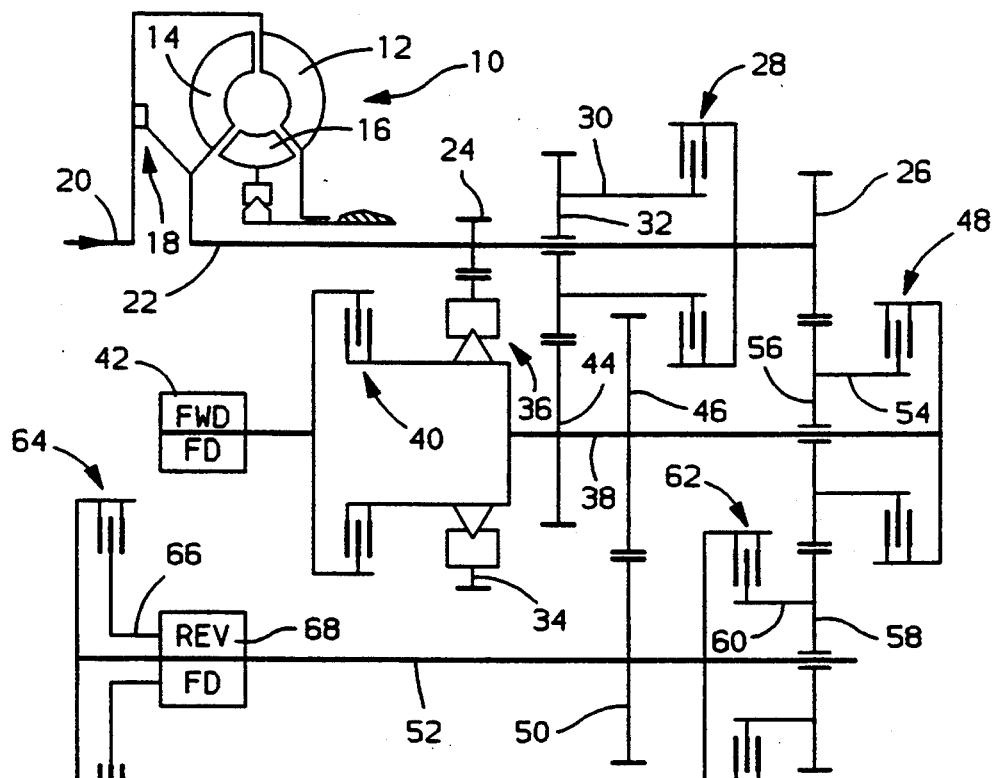
FIG. 1 is one embodiment of a countershaft type power transmission incorporating the present invention.

Referring to the drawings, wherein like characters represent the same or corresponding parts throughout the several views, there is seen in FIG. 1 a conventional torque converter 10 having an input member or impeller 12, an output or turbine 14 and a stator 16. The torque converter 10 is a toroidal hydrodynamic fluid power transfer device which is well known to those in the transmission arts.

A torque converter clutch 18 is incorporated within the transmission and is selectively operable to provide a direct drive connection between an engine output shaft 20 and a transmission input shaft 22. As is well known, the use of a torque converter clutch improves the overall efficiency of the transmission.

The input shaft 22 has rotatably secured therewith a pair of gear members 24 and 26. Also secured to the input shaft 22 is a conventional fluid operated friction clutch 28 which is comprised of an output hub 30 drivingly connected with a gear member 32 which is rotatably supported on the shaft 22. As is well known, actuation of the clutch 28 by fluid pressure will cause the gear 32 to be rotatably fixed with input shaft 22.

The gear 24 meshes with a gear 34 which is drivingly connected through a conventional one-way device 36 to a countershaft 38 and to a conventional fluid operated friction clutch 40. The conventional friction clutch 40 is drivingly connected with a forward final drive gear 42. Thus, when the clutch 40 is engaged, the final drive gear 42 is drivingly connected with the inner member of the one-way device 36.

The countershaft 38 is drivingly connected with a pair of gears 44 and 46 and a conventional fluid operated friction clutch 48. The gear 44 meshes with the gear 32 and the gear 46 meshes with a gear 50 which is rotatably secured to a countershaft 52.

The clutch 48 has an inner hub 54 which is drivingly connected to a gear member 56 which meshes with the gear 26 and with a gear 58 which is drivingly connected to an inner hub 60 of a conventional fluid operated friction clutch 62. The clutch 62 is drivingly connected with the countershaft 52.

The countershaft 52 also has drivingly connected thereto a conventional fluid operated friction clutch 64. The clutch 64 has an output hub 66 which is drivingly connected with a reverse final drive gear 68. The reverse final drive gear 68 and forward final drive gear 42 mesh with a conventional final drive input gear, not shown, which is a component of a conventional differential drive mechanism, not shown.

The gearing and clutches are operable to provide four forward speed ratios and one reverse speed ratio. The low forward speed ratio is established when the friction clutch 40 is engaged and the torque converter 10 is receiving power from an engine. The input shaft 22 drives the gear 24 which in turn drives the gear 34. The forward final drive gear 42 is driven by the gear 34 through the one-way device 36 and clutch 40. The clutch 40 is engaged during all forward speed ratios.

To establish the second forward speed ratio, the clutch 62 is engaged such that the power path from the input shaft 22 is via gears 26, 56 and 58 to the clutch 62, and then via gears 50 and 46 to the shaft 38 which drives the forward final drive gear 42 through the clutch 40. The one-way device 36 is free to overrun the gear 34 during the second and other forward drive ratios.

The third forward speed ratio is established by substantially simultaneously engaging the clutch 48 and disengaging the clutch 62. In the third forward ratio, the power path is from shaft 22 through gears 26 and 56 to clutch 48 which when engaged is drivingly connected to the shaft 38, which as previously described, drives the final drive forward gear 42 through the clutch 40.

To establish the fourth and highest forward speed ratio, the clutch 28 is engaged with substantially simultaneous disengagement of the clutch 48. In the fourth drive ratio, the power path is from shaft 22 through the clutch 28 to gears 32 and 44 which drive the countershaft 38. As previously described, the countershaft 38 drives the gear 42 through the clutch 40.

To establish the reverse drive ratio, the clutch 64 is engaged while the remaining clutches are disengaged. The reverse drive ratio is from shaft 22 via gears 24 and 34 to the one-way device 36. The one-way device 36 drives the countershaft 38 and gear 46 rotatably secured therewith. The gear 46 drives the gear 50 which in turn drives the shaft 52 and through clutch 64 the reverse final drive gear 68.

Thus, the one-way device 36 is operable in both the low forward ratio and the reverse ratio. Neither of these gear ratios have engine coast braking associated therewith.

Figure 2:
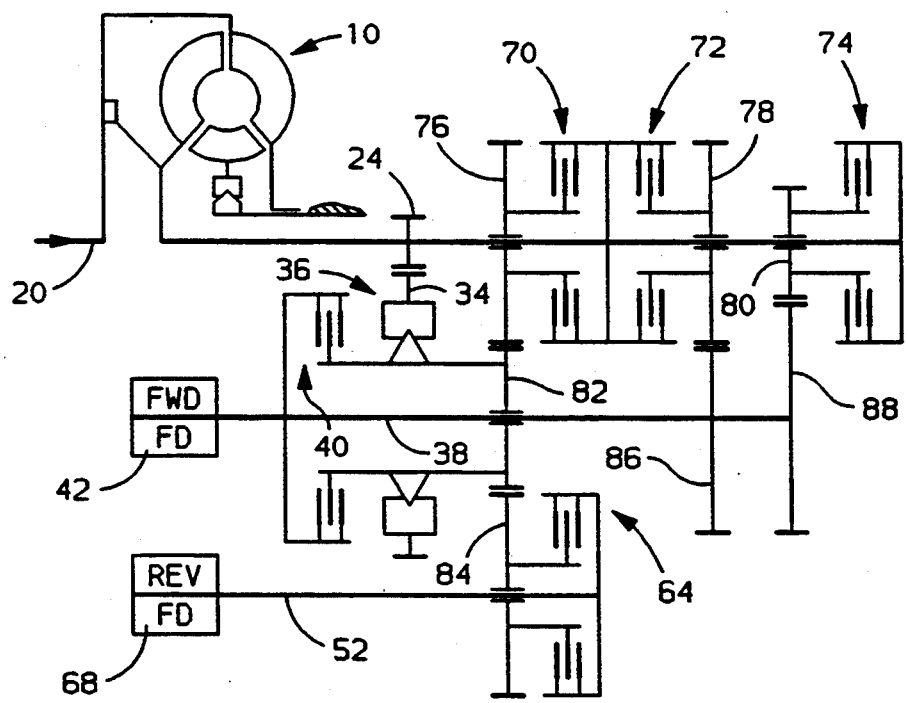
FIG. 2 is another embodiment of a countershaft type transmission incorporating the present invention.

The gearing schematic shown in FIG. 2 includes the torque converter 10 which is drivingly connected to the transmission input shaft 22 and the input gear 24. Input gear 24 drives the gear 34 which in turn drives the outer race of the one-way device 36. The inner race of the one-way device 36 is drivingly connected with the fluid operated friction clutch 40 which rotates with the countershaft 38 and the final drive gear 42.

The input shaft 22 of FIG. 2 also has drivingly connected therewith three conventional fluid operated friction clutches 70, 72 and 74 which are drivingly connected with gear members 76, 78 and 80, respectively. The gear member 76 meshes with a gear member 82 which is drivingly connected with the inner race of the one-way device 36 and therefore the forward clutch 40. The gear 82 also meshes with a reverse gear 84 which is drivingly connected with the reverse clutch 64 which as described for FIG. 1, is drivingly connected to the countershaft 52 and the reverse final drive gear 68.

The gear 78 meshes with a gear 86 which is rotatably secured to the countershaft 38. The gear 80 meshes with a gear 88 which is rotatably secured to the countershaft 38.

The first and lowest forward ratio is established in a manner similar to that described above for FIG. 1. That is, the clutch 40 is engaged such that the drive path is from shaft 22 through gears 24 and 34 to the one-way device 36, and then to the clutch 40 and the forward final drive gear 42.

To establish the second forward ratio, the clutch 74 is engaged which provides a drive connection between shaft 22 and gear 80 which is drivingly meshing with gear 88 such that the countershaft 38 is driven thereby. The countershaft 38 being driven by the gear mesh 80 and 88 will cause overrunning of the one-way device 36.

The third forward ratio is established by the engagement of the clutch 70 and substantially simultaneous disengagement of clutch 74. This provides a drive connection between the shaft 22 and the gear 76 which is meshingly engaged with the gear 82. The gear 82 is drivingly connected through the clutch 40 to the forward final drive gear 42.

The fourth and highest forward drive ratio is established by engagement of the clutch 72 and disengagement of clutch 70, such that a drive path between the shaft 22 and the gear 78 is established. The gear 78 is drivingly connected with the gear 86 which drives the countershaft 38 and therefore the forward final drive gear 42.

The reverse drive path is established by the engagement of clutch 64 and the disengagement of the remaining clutches. In the reverse drive path, the power from the engine is transmitted through shaft 22 to gears 24 and 34, which in turn drive the one-way device 36 to cause rotation of the gear member 82 which meshes with the gear 84. Rotation of the gear 84 is transmitted through the clutch 64 to the shaft 52 and the reverse final drive gear 68.

As with the device shown in FIG. 1, the power transmission of FIG. 2 does not have engine coast braking in the lowest forward ratio or the reverse ratio.

The judicious placement of the clutches permits the axial dimension of the transmission to be maintained at a minimal value. The radial alignment of the clutches 28 and 62 in FIG. 1, and 70 and 64 in FIG. 2, permit the axial length of the gear sets to be compacted to the axial length taken by four fluid operated clutches and four gear meshes. The arrangement shown in FIG. 2 permits all of the clutch members to be assembled within the transmission housing, while the arrangement shown in FIG. 1 will generally require an external or auxiliary housing for the reverse clutch 64. This housing would be attached by bolts or other fasteners to the main transmission housing which would encase the remaining clutches and all of the gears of the transmission.

The embodiments of the invention in which an exclusive property or privilege is claimed are defined as follows:

1. A power transmission comprising:
   an input means for transmitting power from a prime mover;
   an output means including forward output gearing and reverse output gearing for delivering power to a vehicle drive wheel;
   forward low ratio drive establishing means for providing a power transmitting path between said input means and said forward output gearing of said output means including,
   an input gear drivingly connected with said input means,
   one-way drive transmitting means having an input member and an output member,
   forward clutch means selectively operatively connectible between the output member and the output means to establish a forward low ratio drive path;
   reverse ratio drive establishing means for providing a power transmitting path between the input means and the reverse output gearing of the output means including,
   said input gear,
   said one-way drive transmitting means,
   a reversing gear means drivingly connected with the output member,
   and reverse clutch means selectively operatively connectible between the reversing gear means and the output means to establish a reverse ratio drive path.

* * * * *